UNITED STATES PATENT OFFICE.

EDWARD D. KENDALL, OF NEW YORK, N. Y.

COMPOSITION FOR COATING METAL WITH SILVER.

SPECIFICATION forming part of Letters Patent No. 724,108, dated March 31, 1903.

Application filed January 29, 1903. Serial No. 141,030. (No specimens.)

*To all whom it may concern:*

Be it known that I, EDWARD D. KENDALL, a citizen of the United States, residing in the borough of Brooklyn, in the city and State of New York, have invented a new and useful Composition of Matter to be Used for Coating Articles of Base Metal with Silver, of which the following is a specification.

The objects of my invention are to provide a harmless composition for silvering articles made of or covered with brass, copper, German silver, or other base metal (which heretofore has been effected, at least in certain instances, by the use of liquid containing poisonous cyanid or cyanids combined with silver) and simultaneously with the silvering to impart polish to the surface.

My silvering composition consists of the following ingredients, viz: a salt of silver, preferably a haloid salt of silver, a suitable thiosulfate, and a chemically-inert silicious powder, such as infusorial earth, silicious tripoli, so called "electrosilicon," silicious rottenstone, or any suitable form of fine silicious powder. I prefer to use an elutriated infusorial earth free from grit, but having sufficient abrasive quality to impart polish when rubbed on a smooth metallic surface. Of course several such bodies may be mixed together and so used, and excessive abrasion caused, for example, by using ordinary tripoli may be lessened by the addition of clay or talc or, with less advantage, chalk or magnesia.

I do not confine myself to any exact proportions of the constituents of my said composition, because a relatively very small quantity of the said haloid salt mixed with thiosulfate and fine silicious powder will act slowly to deposit a silver film, while a larger quantity acts quickly and thoroughly, and an excess is simply a waste of costly silver salt.

In preparing my silvering composition I prefer to use the following bodies in about the stated proportions, by weight, viz: silver chlorid, one part; sodium thiosulfate, four parts; silicious powder, four parts.

I first mechanically reduce each constituent to fine powder and then thoroughly mix all together. Water may be added to form a paste; but I prefer to keep my silvering composition in the form of dry powder. In using it a small quantity is to be rubbed with a wet cloth on the article to be silvered.

What I claim as new, and desire to secure by Letters Patent of the United States, is—

The herein-described composition of matter consisting of a salt of silver, a suitable thiosulfate and silicious powder, substantially as described.

In testimony whereof I have signed my name to this specification in the presence of two subscribing witnesses.

EDWARD D. KENDALL.

Witnesses:
GUSTAV CIMIOTTI,
E. PARKE COBY.